July 19, 1955        A. P. WEBSTER        2,713,262

METHOD AND APPARATUS FOR TESTING ARMOR PLATE

Filed July 12, 1950        2 Sheets-Sheet 1

INVENTOR.
Andrew P. Webster
BY
D.C. Snyder
ATTORNEY

2,713,262
Patented July 19, 1955

2,713,262
METHOD AND APPARATUS FOR TESTING ARMOR PLATE

Andrew P. Webster, United States Navy

Application July 12, 1950, Serial No. 173,462

9 Claims. (Cl. 73—167)

(Granted under Title 35, U. S. Code (1952), sec. 266)

The invention described herein may be manufactured and used by or for the Government of the United States of America for governmental purposes without the payment of any royalties thereon or therefor.

The present invention relates to a ballistic testing apparatus and process for testing single samples of armor such as body armor.

Previous means of testing armor employ a ballistic pendulum to hold the sample and to measure the velocity of the missile. A test gun is fired at various velocities against a number of samples until the limiting velocity which just penetrates the sample is obtained. This method requires a considerable laboratory set-up, requires a number of samples, and does not yield information on the potential wound damage behind the armor plate in case of penetration.

The ballistic apparatus and process of ballistic testing of the present invention is designed to facilitate ballistic testing of armor specimens, to test single armor samples with a minimum of equipment, to yield comparative data between the test sample and aluminum or steel, and to yield information on the potential damage behind the armor plate.

The ballistic apparatus and process of the present invention reverses the usual laboratory procedure of firing a bullet at various velocities against a number of samples, and utilizes a gun shooting a bullet of known weight at a predetermined fixed velocity against a single unknown sample which is backed up by sheets of a standard material.

Other objects and advantages of the invention will hereinafter become more fully apparent from the following description of the annexed drawing and wherein.

Figure 1:
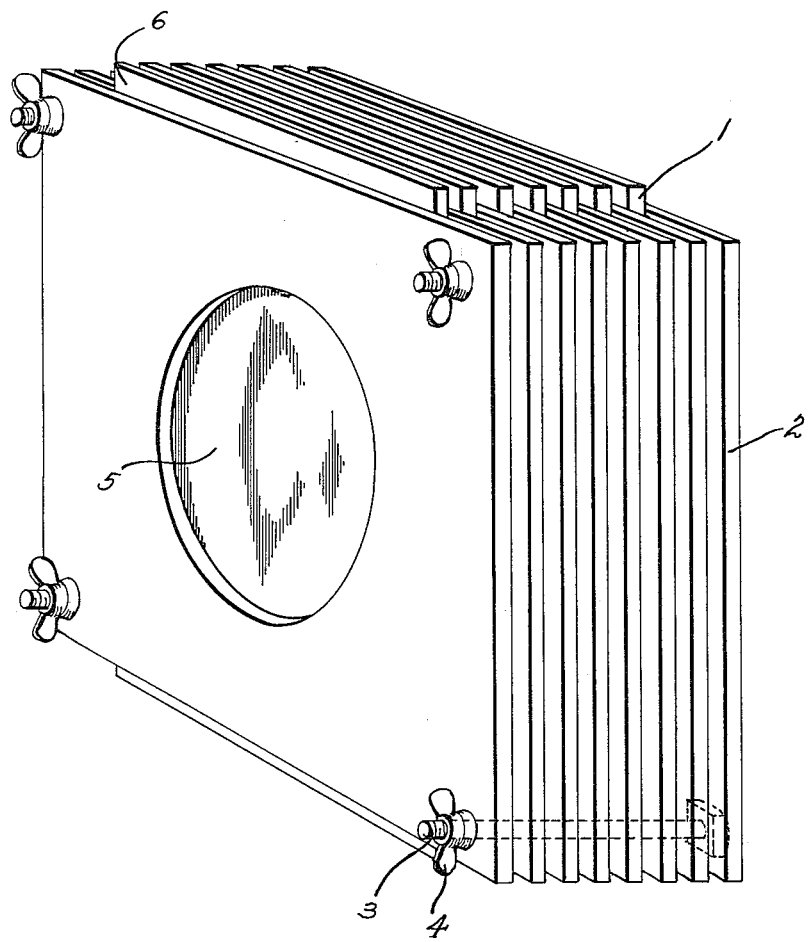
Figure 1 shows a perspective view of the ballistic box.
Figure 2:
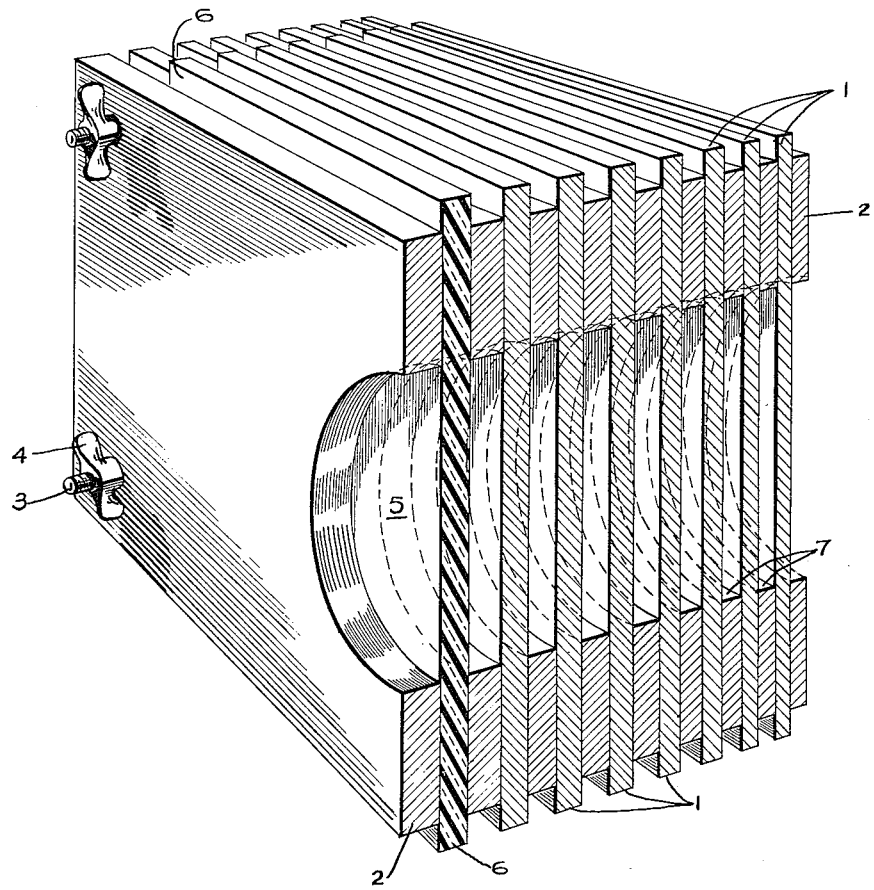
Figure 2 is a cross sectional view of Figure 1 to more clearly show the projectile receiving pockets.

In the embodiment illustrated in the drawings, the apparatus desirably comprises a plurality of standard test plates or the like of any desired standard material, such as, for example, aluminum or steel, designated by the numeral 1 in the drawings, and a plurality of preferably relatively thick slabs 2 or frame members forming a frame or boxlike structure when assembled. The plurality of slabs or frame members 2 may be of any suitable material, for example, aluminum, and are preferably mounted in successive facing relationship. In the embodiment shown, rods or bolts or the like 3 are threaded through aligned holes adjacent the margins of the slabs or frame members 2 and may be provided with wing nuts 4 at the ends of the bolts to engage the end slabs 2.

As shown in the drawings, the plurality of standard test plates 1 are interposed each one between a pair of the slabs or frame members 2 and are firmly held or clamped therebetween by turning up the wing nuts or the like 4.

The slabs or frame members 2 of the ballistic frame or box are each provided with aligned central apertures 5 forming a target area through which a bullet or projectile is fired. The gaps between the standard test plates 1 are denoted as zones or spaces 7 which, in the embodiment shown, have the shape of flat cylinders whose circular boundaries are the curved edges of apertures 5 in slabs 2 and whose bases are the adjacent test plates 1 on each side of a slab 2. It is in one of these zones or spaces that the test bullet will fall after its flight has been spent by passing through the test sample of armor plate and a varying number of test plates 1. The test sample of armor plate 6 is mounted between the first two slabs 2 in the path of the projectile.

The manner in which the ballistic box is used is as follows. Consider the standard or constant gun as a .30 caliber carbine, 110 grain jacketed bullet, having a velocity of 1900 feet per second. The initial shot at the ballistic box through aperture 5 is made, for example, with .02 inch 24ST aluminum alloy sheets as the standard plates 1 between all the slabs 2 of the box. Assume further that the bullet penetrates five sheets or plates 1, strikes the sixth sheet or plate 1 but does not penetrate it and drops in the zone or area between the fifth and sixth plate.

The unknown sheet sample to be tested is then placed between the first and second slabs of the box, and .02 inch 24ST aluminum alloy sheets in the remainder of the box between the slabs 2. It will be noted that these sheets are of the same size as those used in the first test or with the initial shot above. The standard or constant gun is then fired and if the shot penetrates the test sample and two sheets of aluminum alloy, stopping on the third sheet, the following information may be obtained.

Let A denote the number of sheets of .02 inch aluminum required to stop the missile from the constant gun, and S the number of sheets of .02 inch aluminum required to stop the missile after the shot penetrates the unknown sample.

Let U denote the number of aluminum sheets ballistically equivalent to the unknown sample. We then have $U+S=A$ and $U=A-S$.

For the example described, $A=5$ and $S=2$, so that $U=$three sheets of .02 inch aluminum alloy. These three sheets would have a thickness of .06 inch and would weigh .93 pound per square foot. If our test sample weighs normally .744 pound per square foot, it would have a ballistic rating of $$\frac{.744}{.93} \times 100 = 80 \text{ percent}$$

compared to 24ST aluminum alloy. That is, there would be a weight saving of 20 percent over the aluminum for this sample of armor.

The value of S is a measure of the remaining energy after the armor is penetrated, and may be interpreted in terms of wounding power and volume of tissue cavitation from known constants for cubic centimeter of cavity per foot pound of energy.

It is evident from the foregoing explanation that a simple yet effective method and apparatus has been devised for determining the relative ability of various sheet materials to resist bullet penetration.

It should be understood that the foregoing disclosure relates to only a preferred embodiment of the invention and that alterations, such as the use of metallic, ceramic, or plastic sheets for plates 1, may be made therein without departing from the spirit and the scope of the invention as set forth in the appended claims.

What is claimed is:

1. In apparatus for testing armor plate with a projectile to determine the penetration resistance value of the armor plate to the projectile, a plurality of centrally apertured frame members, means connecting said frame members in facing relationship with their central apertures in substantial registration, a test sample armor plate disposed between an end frame member and the next frame member, and a plurality of standard plates disposed between consecutive frame members from said next frame member.

2. In apparatus for testing armor plate with a projectile to determine the penetration resistance value of the armor plate to the projectile, a plurality of frame members including a first frame member and a second frame member between which the armor plate to be tested is positioned, said frame members each having an aperture for permitting passage of the projectile, a plurality of standard plates between the remaining frame members, and means for holding shaid armor plate, standard plates, and frame members in contact with one another.

3. In apparatus for testing armor plate with a projectile to determine the penetration resistance value of the armor plate to the projectile, a plurality of frame members including a first frame member and a second frame member between which the armor plate to be tested is positioned, said first frame member having an aperture for the entrance of the projectile and each succeeding frame member also having an aperture therein and in alignment with said first frame member aperture, a plurality of standard plates alternately positioned between the remaining frame members and means for holding said frame members, armor plate, and standard plates together.

4. In apparatus for testing armor plate with a projectile to determine the penetration resistance value of the armor plate to the projectile, a plurality of frame members including a first frame member and a second frame member between which the armor plate to be tested is positioned, said first frame member having an aperture for the entrance of the projectile and each succeeding frame member also having an aperture therein and in alignment with said first frame member aperture, a plurality of standard plates alternately positioned between the remaining frame members, the edges of each said aperture in a said frame member and said plates on either side thereof forming a zone, said frame members being of such thickness that said zones are of a size to receive said projectile, and means for holding said frame members, armor plate, and standard plate together.

5. The steps in a process of testing armor plate wherein a known gun fires a projectile of known characteristics, comprising firing the projectile into a plurality of spaced standard plates and determining the penetration value of the known projectile in terms of the number of standard plates penetrated, placing the armor plate to be tested a like space in front of a plurality of the spaced standard plates, firing a projectile of said known characteristics into said armor plates spaced in front of the plurality of spaced standard plates, and determining the penetration resistance value of the said armor plate in terms of the number of standard plates to which the armor plate corresponds, in penetration resistance to the projectile of known characteristics.

6. The steps in a process according to claim 5 including determining the number of the spaced standard plates penetrated by the said known projectile after penetration of said armor plate as a measure of the potential wound penetration of said projectile beyond said armor plate.

7. In a process of testing armor plate as to its penetration resistance value, in terms of the number of spaced standard plates penetrate dby a projectile of known characteristics fired from a known gun, the steps comprising firing the projectile into a plurality of equally spaced standard plates and determining the penetration value of the known projectile in terms of the number of standard plates penetrated, placing the armor plate to be tested a like space in front of a plurality of the spaced standard plates, firing a projectile of said known characteristics into said armor plate spaced in front of the plurality of spaced standard plates, and noting the number of standard plates penetrated by the projectile of said second firing, whereby the penetrative resistance value of said armor plate may be determined in terms of the number of standard plates by finding the difference between the number of standard plates penetrated on the first firing and the number of plates penetrated on the second firing.

8. In an apparatus for testing material with a projectile to determine the penetration resistance value of the material to the projectile, a plurality of standard plates, means supporting said standard plates in spaced facing relationship, means supporting a plate of test material in spaced facing relationship in front of said plurality of spaced standard plates in position to receive the initial impact of the projectile, each of said supporting means having an opening therethrough providing a space between said plates, said spaces between said plates of material each being of a size to receive a spent projectile.

9. In an apparatus for testing a material with a projectile to determine the penetration resistance value of the material to the projectile, a plurality of frame members having centrally located openings disposed in spaced facing relationship in substantial alignment, a test sample of material disposed between an end frame member and the next succeeding frame member, and at least one standard plate disposed between consecutive frame members from said next succeeding frame member.

References Cited in the file of this patent

UNITED STATES PATENTS

| 197,398 | O'Neil | Nov. 20, 1877 |
| 2,316,055 | Davey | Apr. 6, 1943 |
| 2,321,039 | Nelson | June 8, 1943 |

OTHER REFERENCES

"The measurement of forces resisting armor penetration," A. V. Masket, Journal of Applied Physics, vol. 20, February 1949, pp. 132–140.